(12) United States Patent
Roberts et al.

(10) Patent No.: US 7,820,043 B2
(45) Date of Patent: Oct. 26, 2010

(54) UNDERDRAIN SYSTEM

(75) Inventors: R. Lee Roberts, Chadds Ford, PA (US); Mark Kevin Addison, Bear, DE (US); Jason Samuel Schmoyer, Glen Mills, PA (US); Aleksandr Vladimirovich Ilyin, Chester Spring, PA (US)

(73) Assignee: RG Delaware Inc., Wilmington, DE (US)

( * ) Notice: Subject to any disclaimer, the term of this patent is extended or adjusted under 35 U.S.C. 154(b) by 854 days.

(21) Appl. No.: 11/400,330

(22) Filed: Apr. 10, 2006

(65) Prior Publication Data
US 2007/0235382 A1    Oct. 11, 2007

(51) Int. Cl.
 *B01D 24/24* (2006.01)
(52) U.S. Cl. .................... 210/232; 210/291
(58) Field of Classification Search ............... 210/289, 210/291, 293, 232
See application file for complete search history.

(56) References Cited

U.S. PATENT DOCUMENTS

| | | | | |
|---|---|---|---|---|
| 2,378,239 | A | * | 6/1945 | Myron ................ 210/293 |
| 3,110,667 | A | * | 11/1963 | Stuppy ................ 210/275 |
| 3,762,559 | A | * | 10/1973 | Knoy et al. ................ 210/293 |
| 4,133,766 | A | | 1/1979 | Adie |
| 5,618,426 | A | | 4/1997 | Eischen et al. |
| 5,976,370 | A | | 11/1999 | Medworth |
| 6,048,132 | A | | 4/2000 | Kupke et al. |
| 6,797,166 | B1 | | 9/2004 | Hambley et al. |

FOREIGN PATENT DOCUMENTS

KR    2001 0068818    7/2001

OTHER PUBLICATIONS

Hool et al, Concrete Engineers' Handbook, 1918, McGraw-Hill, pp. 142-142.*
Photograph obtained from web site at www.awifilter.com/products/underdrain/index.htm.
EP Application No. EP07251543; European Partial Search Report, Oct. 5, 2007.
EP Application No. EP07251543: European Extended Search Report, Jan. 29, 2008.
U.S. Appl. No. 11/812,848, filed Jun. 22, 2007.

* cited by examiner

*Primary Examiner*—Matthew O Savage
(74) *Attorney, Agent, or Firm*—Merek, Blackmon & Voorhees, LLC

(57) ABSTRACT

A filter system for filtering water and/or wastewater which includes an underdrain system having a plurality of laterals that are anchored to the floor of a filter by a hold-down assembly. Preferably, the hold-down assembly does not rely on grout or other substance that is applied in a viscous or semi-viscous state and subsequently hardened as the primary means for connecting the underdrain laterals to the floor of the filter. Preferably, the hold-down assembly includes hold-down clips that can move relative to an anchor assembly and corresponding underdrain blocks so that the hold-down clips can cooperate with any desired portion of the corresponding underdrain blocks.

13 Claims, 13 Drawing Sheets

UNDERDRAIN SYSTEM

FIELD OF THE INVENTION

The present invention is directed to significant improvements in underdrain systems used in filters to filter water and/or wastewater. More particularly, the present invention is directed to an improvement in underdrain systems having laterals.

BACKGROUND OF THE INVENTION

Various underdrain systems have been developed for filter systems that filter water and wastewater. The underdrain systems are a key component of a filter system as they receive liquid and/or air throughout virtually all phases of filtering including washing phases and filtration phases. In washing phases, the underdrain typically directs liquid and/or air upwardly through the filter bed to remove impurities trapped in the filter bed during a filtration phase. The liquid and/or air must be uniformly distributed over the filter bed to ensure the filter bed is properly cleaned. In an upflow filter, the underdrain, during the filtration phase, directs influent upwardly through the filter bed so that impurities may be removed therefrom. In a downflow filter, the underdrain receives the effluent and conveys it to a suitable storage location for subsequent use. Because of the key nature of underdrains to the operation of the filter system, an underdrain failure often results in shutdown of the filter system for prolonged periods.

A common type of underdrain is the "lateral" style. This type of underdrain is typically made of injection molded or extruded plastic or extruded clay. The underdrain blocks are arranged in rows termed "laterals". The laterals are typically spaced on approximately 12 inch centers leaving an approximately 1 inch clearance between the laterals. The underdrain blocks are subject to uplift forces that tend to separate the underdrain block from the filter floor. A common source of this uplift force is due to the upward flow of water and/or air pushing against the filter floor with a force equal and opposite to the resistance of the flow across the underdrain block. There are a number of different systems used to structurally connect the underdrain block to the filter floor purportedly to resist these upward forces.

Figure 1:
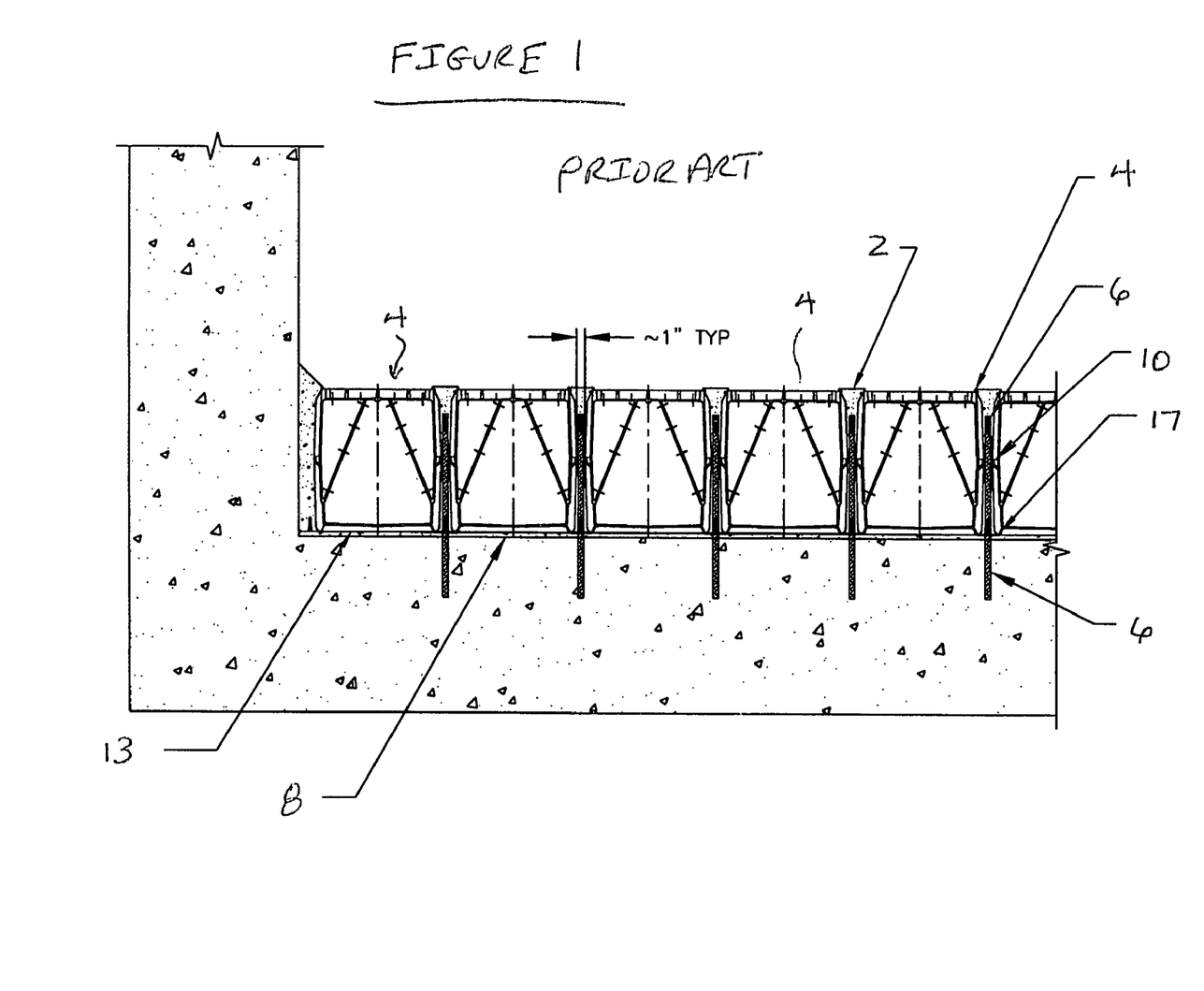
FIG. 1 is a fragmentary sectional view of a prior art filter adjacent to the flume.
Figure 2:
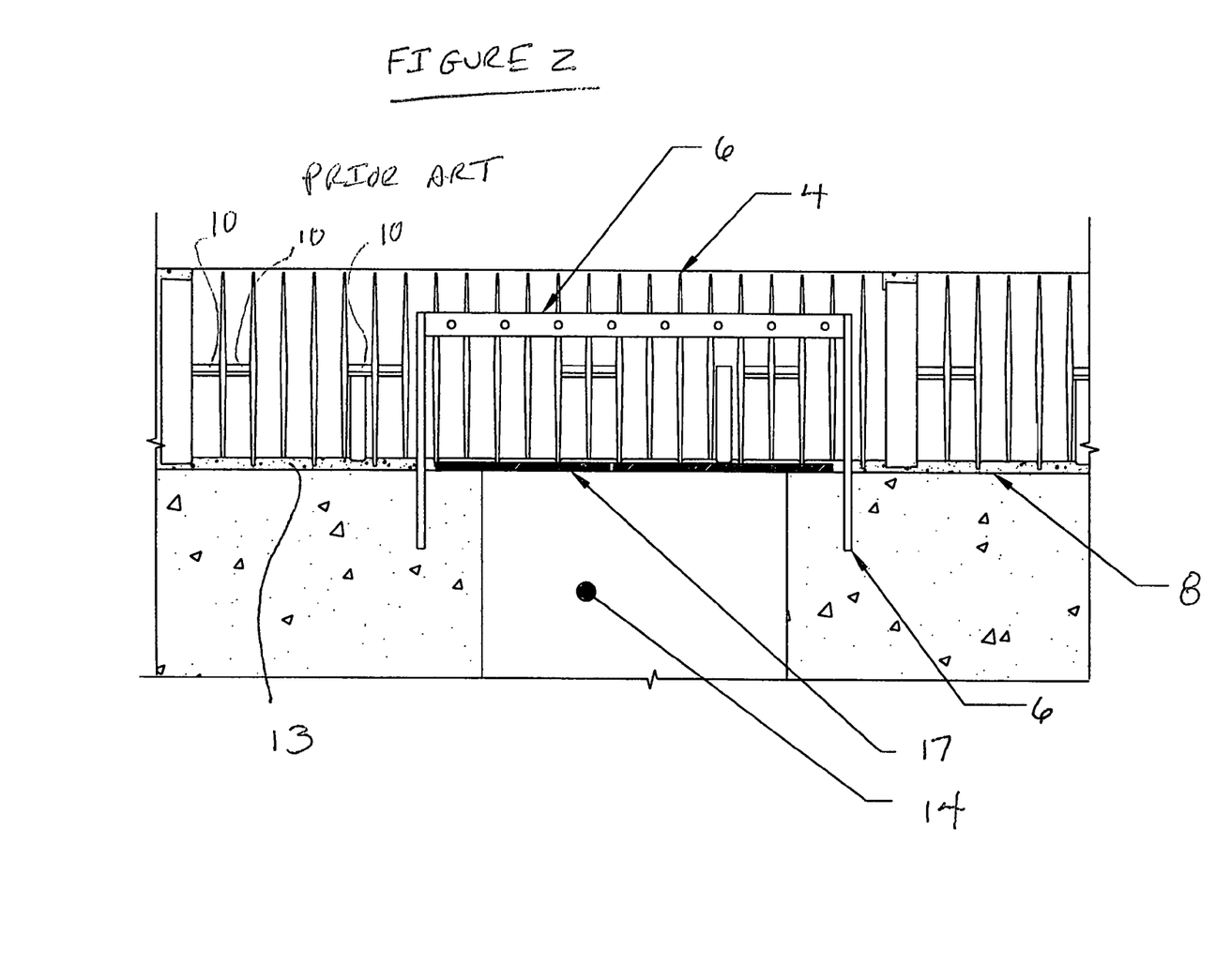
FIG. 2 is another fragmentary sectional view of the filter depicted in FIG. 1 (with the grout between adjacent underdrain blocks being omitted for clarity), this view being rotated 90 degrees from the view in FIG. 1.

FIGS. 1 and 2 depict a typical system used to anchor underdrain laterals to the filter floor. In this system, grout 2 is placed into the space between adjacent underdrain blocks 4. The grout is designed to act in concert with the anchor assemblies 6 to secure the underdrain blocks 4 to the filter floor 8. The grout 2 and the anchor assemblies 6 essentially form a reinforced concrete beam that "keys" into lugs or ribs 12 (see FIG. 2) molded into the underdrain laterals. The anchor assembly is typically bonded into holes in the filter floor with a suitable adhesive or cast into the floor during construction. A frequently used configuration is to form a seal between the underdrain and the filter floor adjacent to the filter flume using grout in order to isolate the uplift load to the flume area 14. The isolation of the load to flume area 14 limits the requirement of the hold-down system to the area of the flume. This arrangement eliminates costly hold-downs in the remaining portions of the filter. The underdrain laterals are embedded into a layer or "bed" of grout 13 placed on the concrete floor 8 to form the seal. This "bed" of grout 13 also aids in leveling the underdrain system. Referring to FIG. 2, grout strips 17 extend between adjacent underdrain blocks 4 above the flume area 14 to support the grout above the flume area 14.

In order for the underdrain installation to be structurally sound, the grout must have sufficient strength to transfer load from the laterals to the anchors and must fully encase the anchor members and key into the lugs or ribs molded into the laterals. Low strength grout or voids around the anchors or the lugs create weak areas that can lead to structural failure. However, the space between the laterals is very narrow which limits accessibility to place the grout under and around the anchors. The strength of the grout is inversely proportional to the water/cement ratio of the grout. On the other hand, the workability of the grout is directly proportional to the water/cement ratio. Thus, these characteristics of grout are conflicting and often lead to installation errors. For example, if the grout has high strength but is too stiff to properly place into the space between the laterals, there will be voids in the grout. On the other hand, if the grout is "loose" enough to properly apply between the laterals but has too high of a water/cement ratio, the grout will not have sufficient strength to hold the laterals in place over the life of the filter system. Even if the grout has the correct combination of strength and workability, the quality of the installation is highly dependent on the skill of the installer who must be very careful to break up any air bubbles and ensure no voids are present in the grout. Also, in order to be effective, the anchors must be properly located and securely installed into the filter floor slab.

Figure 3:
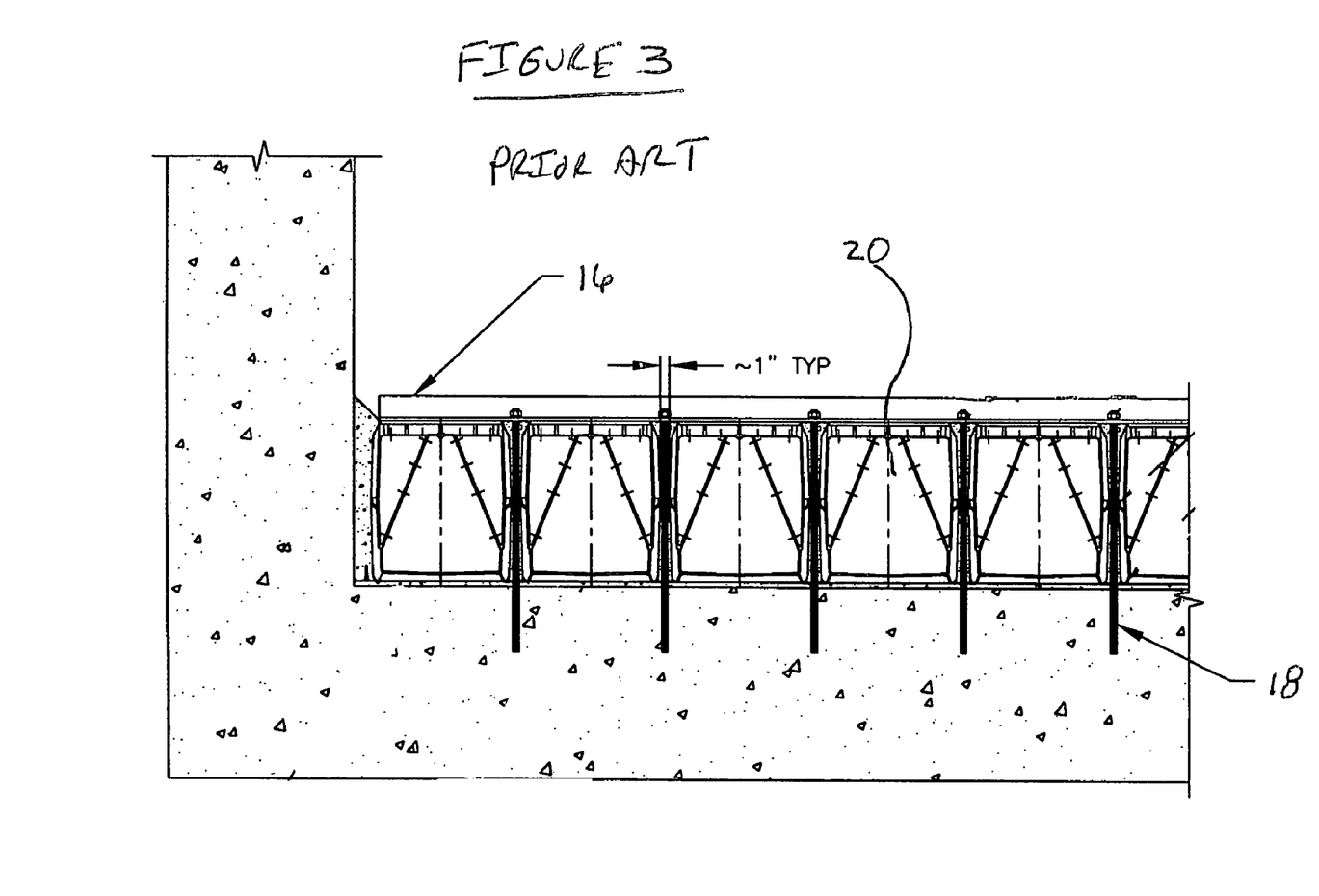
FIG. 3 is a fragmentary sectional view of another prior art filter adjacent to the flume.
Figure 4:
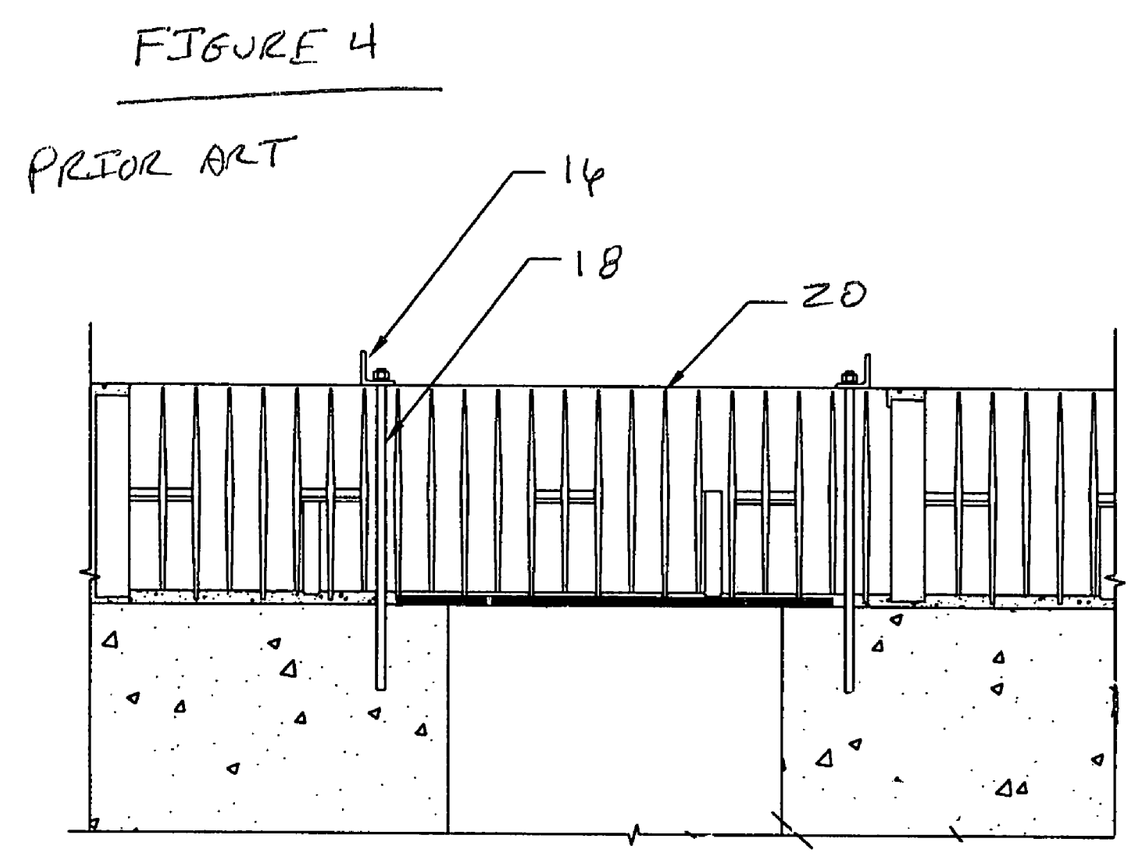
FIG. 4 is another fragmentary sectional view of the filter depicted in FIG. 3, this view being rotated 90 degrees from the view in FIG. 3.

FIGS. 3 and 4 depict another system used to tie the laterals to the filter floor. In this system, angles 16 or other structural members are positioned across the uppermost surface of the laterals. The angles 16 are connected to the floor using all-threads 18 or similar structures. While this system does not rely on grout as the sole means to tie the underdrain blocks to the filter floor, it still suffers from a number of significant disadvantages. The strength of the hold-down system is dependent in part upon the section modulus of the member, the strength of the material used, and the distance between the all-thread connecting to the filter floor. In order to achieve and maintain the necessary strength, angles 16 or other structural members must be relatively large in section and must be constructed of corrosion resistant materials that adds considerable cost to the underdrain system. In addition, angles 16 or other structural members must be in intimate contact with underdrain laterals 20 to properly maintain a load path. This requirement is problematic because most underdrain laterals 20 have irregular features on their upper surface or have non-structural elements such as porous plates that prohibit intimate contact. Any gaps between the underdrain laterals and angles 16 or other structural members could allow upward movement of the underdrain lateral before the hold-down system can resist the uplift forces. This situation will result in a premature failure of the underdrain system.

Most prior art hold-down systems use rebar or other threaded rod embedded into the filter floor such that the anchoring system exerts a tensile load on the filter floor. Filter floors are commonly constructed of concrete, which has very poor tensile strength compared to its compressive and shear strength.

There are various other types of mechanical hold-down systems that do not rely on grout. Most of these systems are used in false-bottom type underdrain systems and do not readily apply to lateral type underdrain systems.

OBJECTS AND SUMMARY OF THE INVENTION

An object of the present invention is to provide a novel and unobvious underdrain system.

Another object of a preferred embodiment of the present invention is to provide an underdrain system that provides superior resistance to uplift forces.

A further object of a preferred embodiment of the present invention is to provide an underdrain system the performance of which is less subject to variances in materials or skill of the laborer.

Yet another object of a preferred embodiment of the present invention is to provide an underdrain that is free from hold-down structures secured to the uppermost portion of the underdrain blocks.

Still another object of a preferred embodiment of the present invention is to provide an underdrain system that does not primarily rely upon grout to tie the underdrain laterals to the floor of a filter system.

Yet still another object of a preferred embodiment of the present invention is to provide a hold-down assembly for an underdrain system that can be readily adjusted to accommodate installation variances and/or product variances.

Yet a further object of a preferred embodiment of the present invention is to provide a hold-down assembly for an underdrain system including an anchor member embedded in the filter floor in such a manner that forces exerted on the filter floor due to uplift forces induced by the underdrain are primarily in shear.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to an apparatus for use in a filter system for filtering water or wastewater. The apparatus includes an underdrain block for supporting at least a portion of a filter bed. The underdrain block has a plurality of exterior walls forming a substantially hollow interior. The plurality of exterior walls include a top wall, a bottom wall and a pair of sidewalls extending between the top wall and the bottom wall. At least one of the pair of sidewalls of the underdrain block have a receptacle. The receptacle is disposed on an exterior surface of the underdrain block. A hold-down member is operably associated with the underdrain block for preventing the underdrain block from lifting upwardly. At least a portion of the hold-down member extends into the receptacle.

Another embodiment of the present invention is directed to an apparatus for use in a filter system for filtering water or wastewater. The apparatus includes an underdrain block for supporting at least a portion of a filter bed. The underdrain block has a plurality of exterior walls forming a substantially hollow interior. The plurality of exterior walls include a top wall, a bottom wall and a pair of sidewalls extending between the top wall and the bottom wall. At least one of the pair of sidewalls of the underdrain block has an outwardly extending protrusion forming a first hold-down member. The outwardly extending protrusion is disposed between the top wall and the bottom wall of the underdrain block. The apparatus further includes a second hold-down member operably associated with the first hold-down member for preventing the underdrain block from lifting upwardly.

A further embodiment of the present invention is directed to an apparatus for use in a filter system for filtering water or wastewater. The apparatus includes an underdrain block for supporting at least a portion of a filter bed of a filter system. The underdrain block has a plurality of exterior walls forming a substantially hollow interior for receiving fluids during operation of the filter system. The underdrain block has a longitudinal axis. The apparatus further includes a hold-down assembly including an anchor member adapted to be embedded in a floor of a filter system and a hold-down member for engaging at least a portion of the underdrain block. The hold-down member is adjustable relative to the anchor assembly to vary a position of the hold-down member along the longitudinal axis of the underdrain block.

Still another embodiment of the present invention is directed to an apparatus for use in a filter system for filtering water or wastewater. The apparatus includes a first underdrain block for supporting at least a portion of a filter bed of a filter system. The first underdrain block has a plurality of exterior walls forming a substantially hollow interior for receiving fluids during operation of the filter system. The apparatus further includes a second underdrain block for supporting at least a portion of a filter bed of a filter system. The second underdrain block has a plurality of exterior walls forming a substantially hollow interior for receiving fluids during operation of the filter system. The first underdrain block is positioned adjacent to the second underdrain block. The apparatus further includes a hold-down assembly having an anchor member adapted to be embedded in a floor of a filter system and a hold-down member having a first section for engaging at least a portion of the first underdrain block and a second section for engaging at least a portion of the second underdrain block. The first section is connected to the second section. The first section is further adjustable relative to the second section.

Yet another embodiment of the present invention is directed to an apparatus for use in a filter system for filtering water or wastewater. The apparatus includes an underdrain block for supporting at least a portion of a filter bed of a filter system. The underdrain block has a plurality of exterior walls forming a substantially hollow interior for receiving fluids during operation of the filter system. The underdrain block has a longitudinal axis. The apparatus further includes a hold-down assembly having an anchor member fixed relative to the underdrain block and a hold-down member for engaging at least a portion of the underdrain block. The hold-down member is adjustable relative to the anchor assembly and the underdrain block to vary a position of the hold-down member along the longitudinal axis of the underdrain block.

Yet still another embodiment of the present invention is directed to an apparatus for use in a filter system for filtering water or wastewater. The apparatus includes an underdrain block for supporting at least a portion of a filter bed. The underdrain block has a plurality of exterior walls forming a substantially hollow interior. A hold-down assembly includes an anchor fixed relative to the underdrain block, a first hold-down member and a second hold-down member operably associated with the first hold-down member for preventing the underdrain block from lifting upwardly. The first hold-down member has a receptacle. At least a portion of the second hold-down member extends into the receptacle.

Yet a further embodiment of the present invention is directed to an apparatus for use in a filter system for filtering water or wastewater. The apparatus includes a flume formed in a filter floor and an underdrain block for supporting at least a portion of a filter bed. The underdrain block has a plurality of exterior walls forming a substantially hollow interior. The underdrain block extends across the flume. The apparatus further includes a hold-down assembly operably connected to the underdrain block. The hold-down assembly includes an anchor embedded in the filter floor such that uplift forces on said underdrain exert a shear force on said filter floor.

DETAILED DESCRIPTION OF THE PREFERRED EMBODIMENTS OF THE INVENTION

The preferred forms of the invention will now be described with reference to FIGS. 5-21. The appended claims are not limited to the preferred forms and no term and/or phrase used herein is to be given a meaning other than its ordinary meaning unless it is expressly stated that the term and/or phrase shall have a special meaning. The only terms in this Specification having a special meaning are the terms "hold-down member." As used herein "hold-down member" does not include within its meaning grout or other substance that is applied in a viscous or semi-viscous state and is subsequently hardened.

Figure 5:
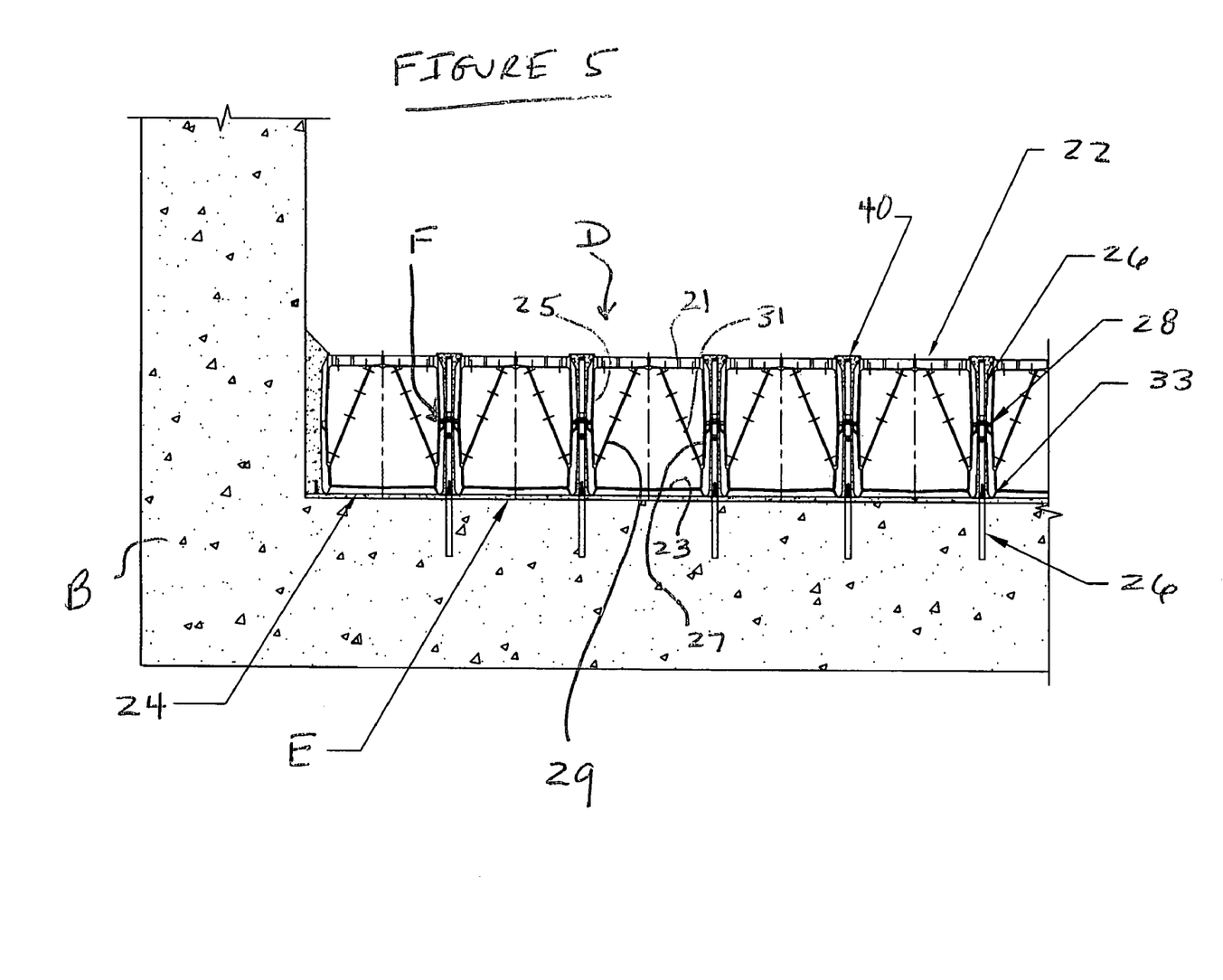
FIG. 5 is a fragmentary sectional view of a filter adjacent to the flume formed in accordance with a preferred embodiment of the present invention.
Figure 6:
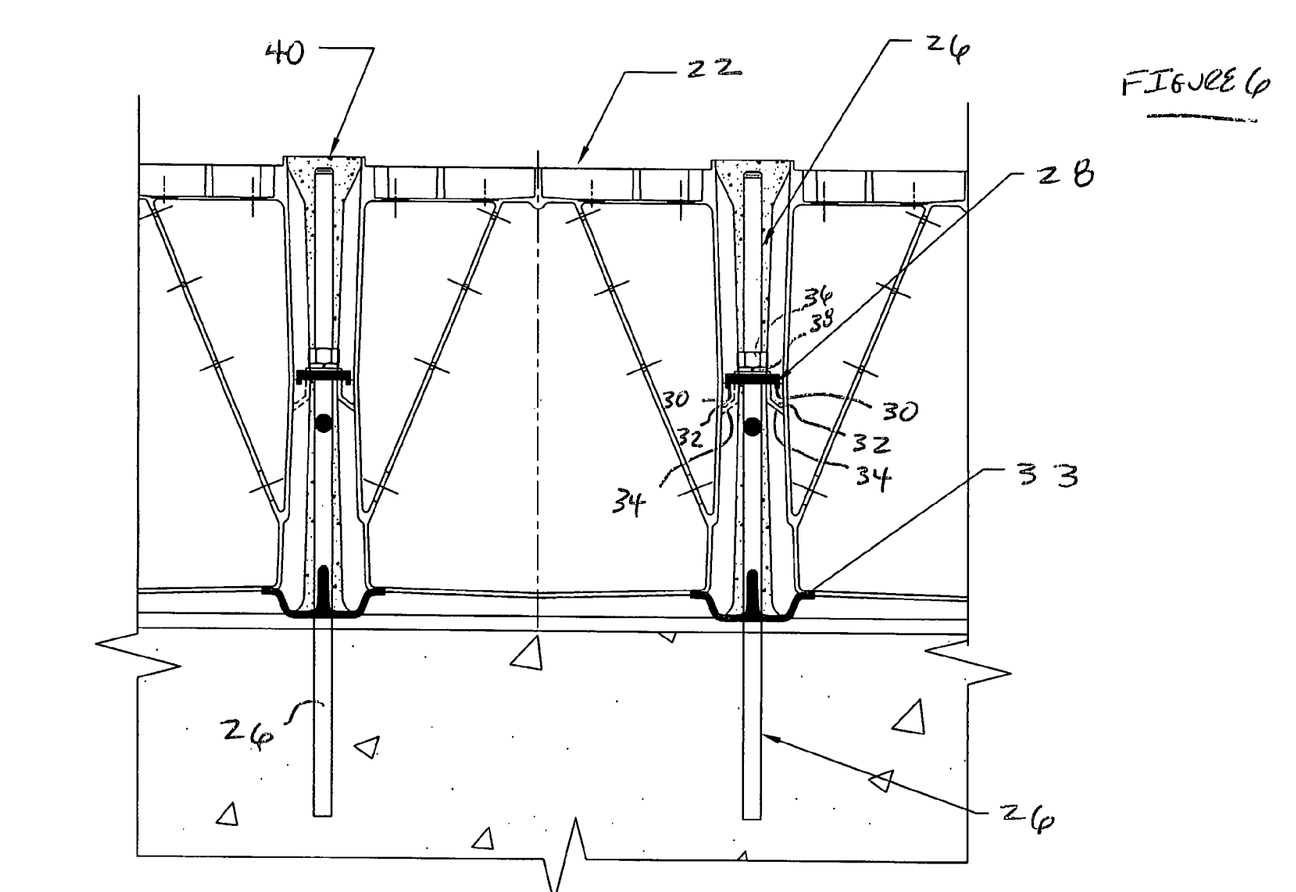
FIG. 6 is an enlarged portion of the filter depicted in FIG. 5.
Figure 7:
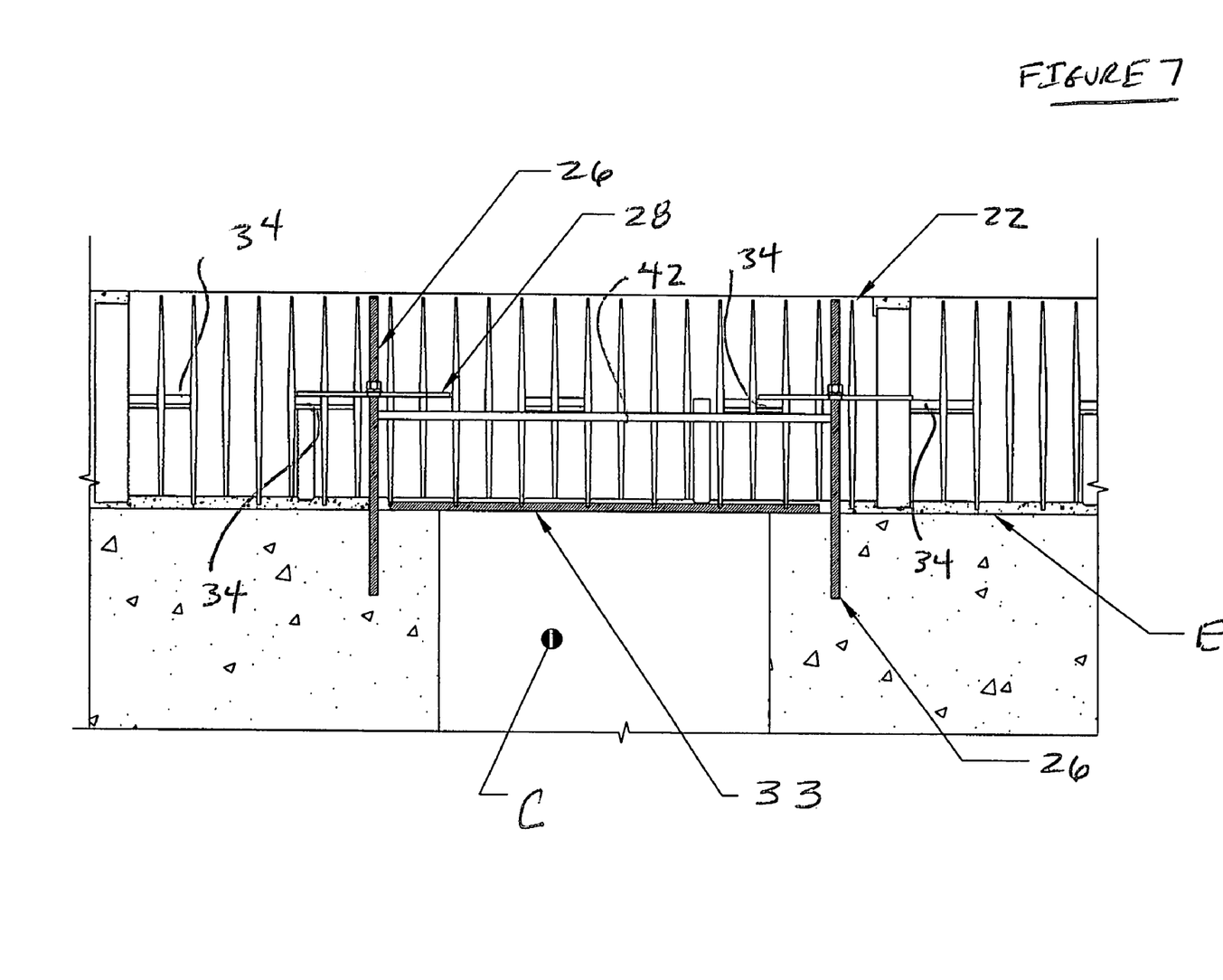
FIG. 7 is another fragmentary sectional view of the filter depicted in FIG. 5 (with the grout between adjacent underdrain blocks being omitted for clarity), this view being rotated 90 degrees from the view in FIG. 5.

FIGS. 5 through 7

Referring to FIGS. 5, 6 and 7, a portion of a filter A for filtering water and/or wastewater is illustrated in one of many possible configurations. It should be noted that filter A could be a polishing filter or a clarifier. Further, filter A could be an upflow filter, a downflow filter, a bi-flow filter or any combination thereof (e.g. a filter system formed in accordance with this preferred embodiment of the present invention could include an upflow filter in combination with a downflow filter).

Filter A has a housing B and a Flume C (see FIG. 7) formed in the lower area of housing B. As illustrated in FIGS. 5 to 7, filter housing B is formed from concrete. However, it will be readily appreciated that housing B may be formed of any suitable material. Filter A further includes an underdrain system D disposed above the floor E of filter A. The underdrain system E includes a plurality of underdrain blocks 22 arranged in rows commonly referred to as laterals. The underdrain blocks 22 can be of any desired configuration. Preferably, the underdrain blocks 22 are designed to receive a porous plate used to support filter media without the need for support gravel. The underdrain blocks 22 include a top wall 21, a bottom wall 23 and a pair of sidewalls 25 and 27. Underdrain blocks 22 include a pair of inclined internal walls 29 and 31. The underdrain blocks 22 have a hollow cavity extending the length of the block through which a fluid passes during various phase of operation of the filter. The top wall 21 includes a plurality of openings (not shown) along the length of the block to allow fluid to pass into and out of underdrain blocks 22. Underdrain blocks 22 may have a structure similar to the TRILATERAL® underdrain or the INFINITY® underdrain. For variations on the INFINITY® underdrain see U.S. Pat. Nos. 6,325,931; 6,740,237; 6,569,327; and, 6,989,096 which are incorporated by reference herein in their entirety. It should be noted that the structure of the underdrain block is not limited to any of the aforementioned underdrains. Rather, the structure of the underdrain block may be varied as desired.

A given lateral or row in an underdrain system formed in accordance with this preferred embodiment of the present invention could include one or more underdrain blocks 22. The number of underdrain blocks 22 in a lateral or row of an underdrain system depends at least in part on the size of the filter and the size of the underdrain blocks 22. Underdrain blocks 22 can vary widely in size. For example, a block can be four feet or less in length to in excess of thirty feet in length.

Preferably, the underdrain blocks 22 rest on a bed of grout 24. The grout bed 24 serves two primary functions. First, it aids in leveling the underdrain blocks 22. Secondly, it forms a seal about flume C. This seal serves to isolate flume C so that only the portions of underdrain blocks 22 adjacent flume C experience significant uplift forces caused by fluids moving upwardly from flume C through underdrain blocks 22. Grout strips 33 extend across flume C and provide support for grout above flume C.

A hold-down assembly F prevents the underdrain blocks from lifting upwardly and separating from the filter floor E. No portion of the hold-down assembly F of this preferred embodiment of the present invention is in direct contact with the uppermost surface of underdrain blocks 22. The hold-down assembly F includes a plurality of anchors 26 embedded in filter floor E between the laterals. Preferably, anchors 26 are all-threads threaded over the entire portion of the anchor. However, any suitable anchor may be used. As seen in FIGS. 6 and 7, hold-down assembly F further includes hold-down clips 28 mounted on each of the anchors 26. The hold-down clips 28 preferably include a plurality of pins 30 that extend into cavities 32 formed in lugs 34 of the underdrain blocks 22 providing an interlocking connection between underdrain blocks 22 and the corresponding hold-down clips

28. As opposed to the interlocking connection, hold-down clip 28 could merely abut the corresponding lugs 34 rather than extend into cavities 32.

Preferably, lugs or ribs 34 are formed as one-piece with the sidewalls of the underdrain block 22. However, it will be readily appreciated that the lugs or ribs 34 can be formed as a separate piece from the underdrain blocks 22. The lugs or ribs 34 are preferably disposed at approximately the midway point between the top wall 21 and the bottom wall 23. However, the location of lugs or ribs 34 may be varied as desired. Nuts 36 and washers 38 secure hold-down clips 28 to the corresponding underdrain blocks 22 thereby providing a direct structural tie to the filter floor E.

The hold-down clips 28 may have one or more pins on each side so that a single hold-down clip 22 can be directly connected to one or more lugs of adjacent underdrain blocks 22. FIGS. 6 and 7 illustrate one of many possible configurations. In this configuration, one of a pair of pins 30 of the left most hold-down clip 28 is received in a lug 34 of one underdrain block 22 while a second pin of the pair of pins 30 of the left most hold-down clip 28 is received in a lug 34 of an adjacent underdrain block 22. Further, two of four pins 30 of the right most hold-down clip 28 are received in two lugs of an underdrain block 22 while the other two of the four pins 30 are received in two lugs of an adjacent underdrain block 22. While the pins 30 are preferably disposed at each of the four corners of the hold-down clips 28, the positioning of the pins 30 and the number of pins may be varied as desired.

Grout 40 may be formed between the laterals to entirely cover hold-down assembly F. In this case, the grout 40 does not act as a hold-down but merely a seal to protect the components of hold-down assembly F from corrosive elements of a filter. This allows the components of hold-down assembly F to be made from less expensive materials. Further, rebar 42 may be used to interconnect anchors on opposite sides of flume C to provide further reinforcement. Where rebar 42 is used, the grout 40 will also act to prevent lifting of the underdrain blocks 22 and limit the bending stress of underdrain block 22.

FIG. 8

Figure 8:
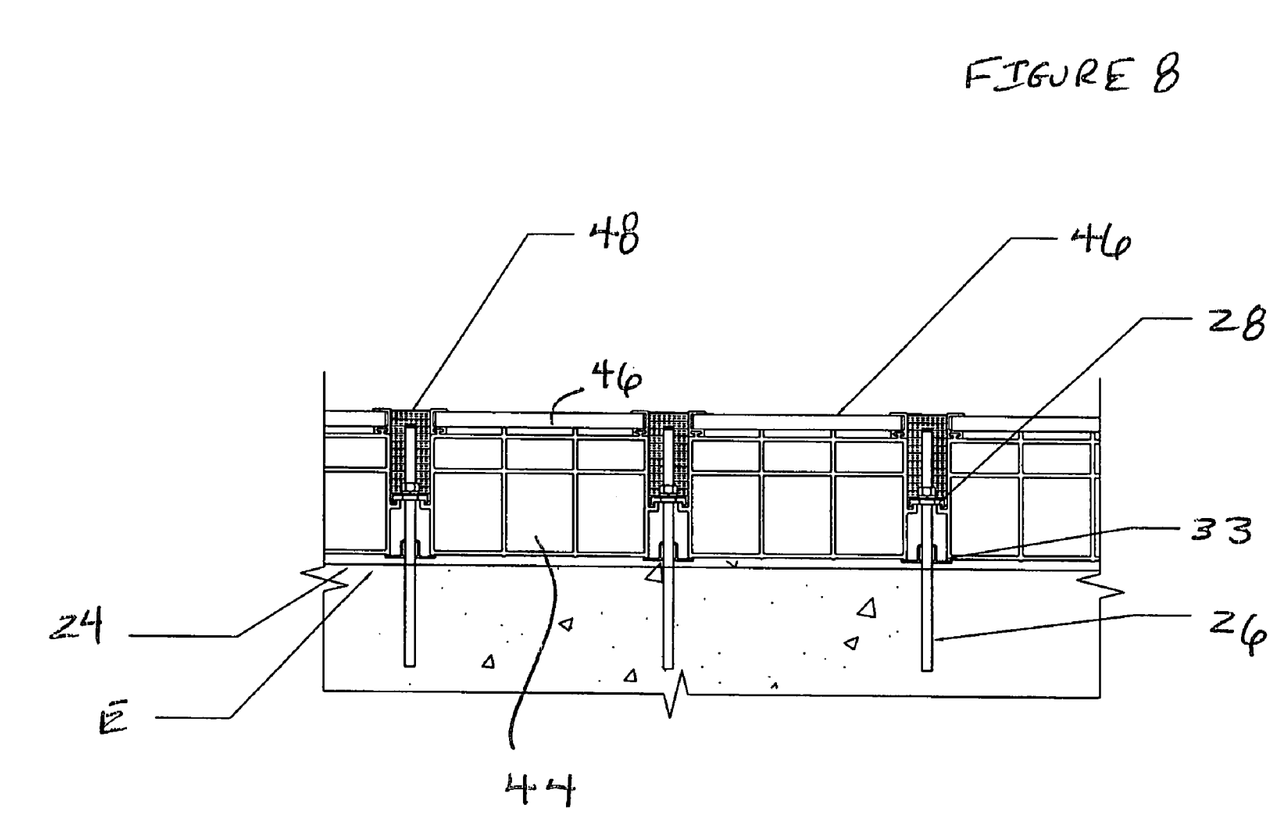
FIG. 8 is a fragmentary sectional view of a filter adjacent to the flume formed in accordance with another preferred embodiment of the present invention.
Figure 9:
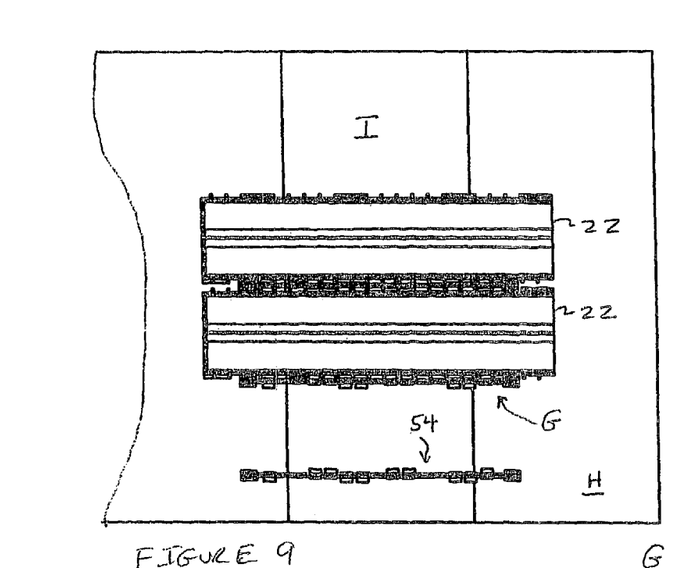
FIG. 9 is a plan view of a portion of a filter adjacent to the flume formed in accordance with a further preferred embodiment of the present invention.

FIG. 8 depicts an embodiment similar to that described in FIGS. 5 to 7 and, therefore, only the differences will be described in detail. Similar elements have the same reference characters. The underdrain blocks 44 are of the type disclosed in U.S. Pat. No. 6,740,237 and, therefore, will not be described in detail. Porous plates 46 are preferably slidably connected to the underdrain blocks 44 in the manner disclosed in U.S. Pat. No. 6,740,237. A filler material 48 other than grout is used to fill the voids between the laterals and provide a seal. The filler material may be a plastic extrusion or compressible material such as polyurethane or other suitable material. The hold-down assembly of this embodiment is the same as the embodiment disclosed in FIGS. 5 to 7.

FIGS. 9 through 18

Figure 10:
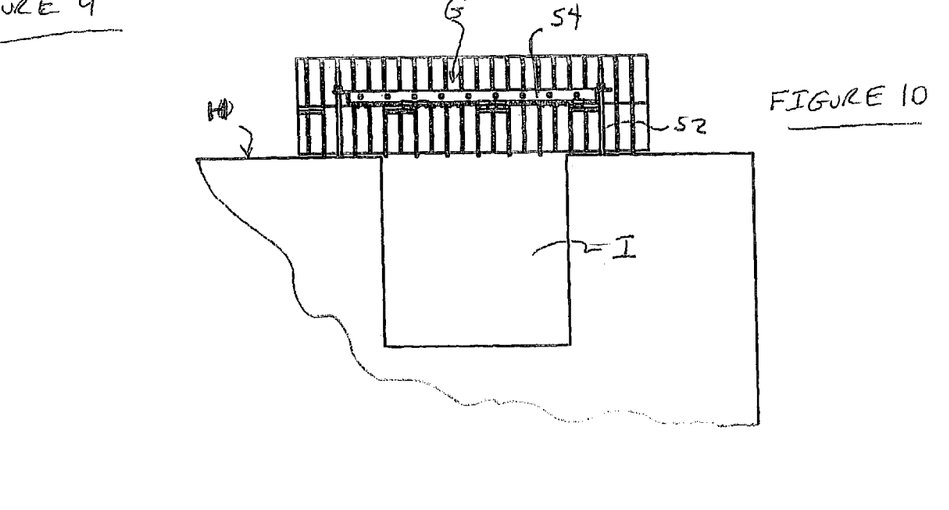
FIG. 10 is a side view of the filter illustrated in FIG. 9.
Figure 11:
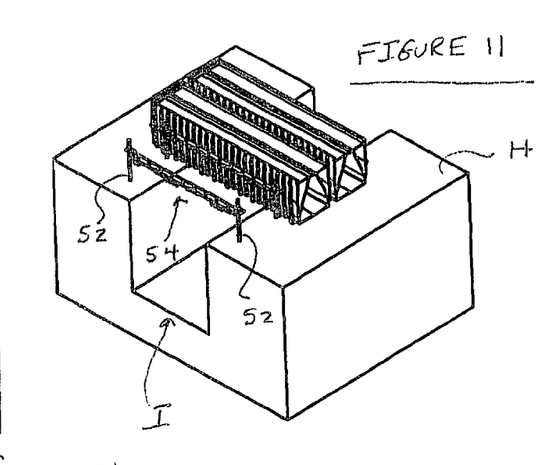
FIG. 11 is a perspective of the filter illustrated in FIG. 9.
Figure 12:
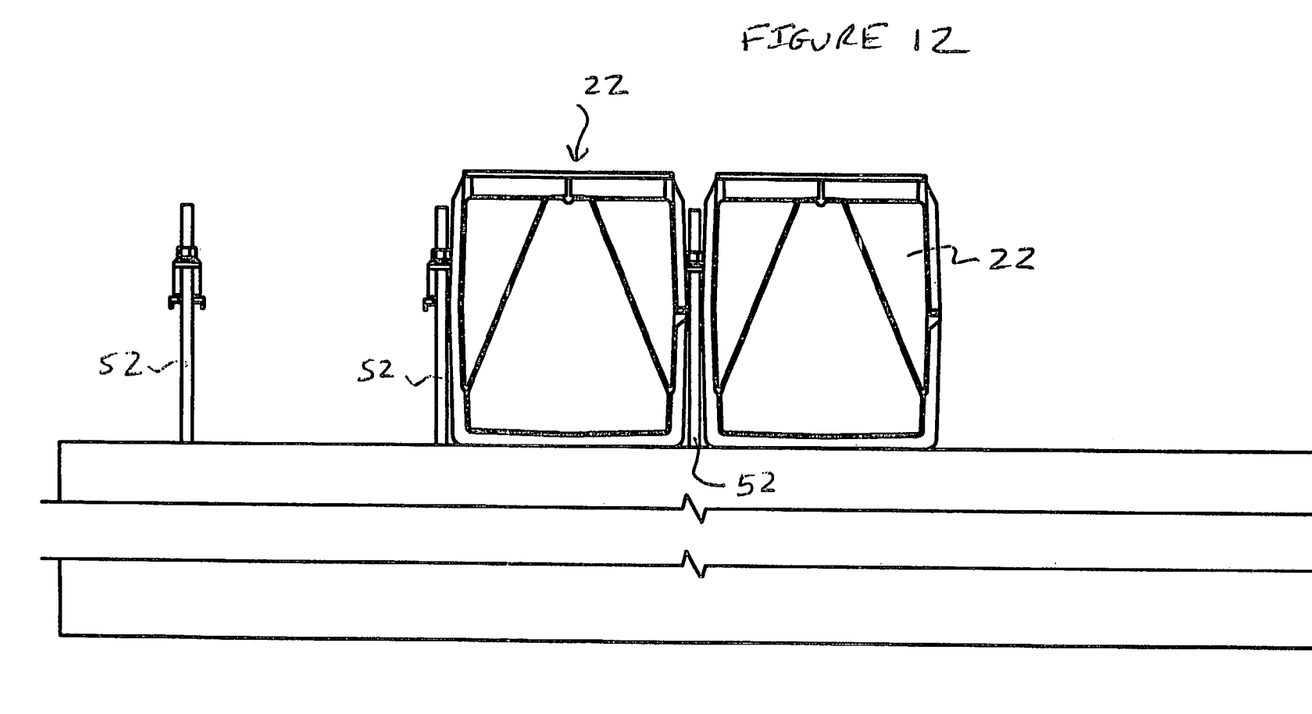
FIG. 12 is an enlarged end view of the filter illustrated in FIG. 9.
Figure 13:
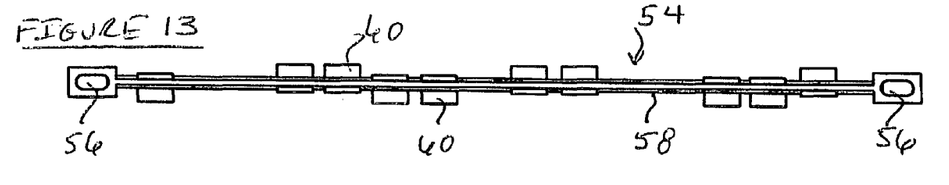
FIG. 13 is a plan view of a portion of the hold-down assembly of the filter depicted in FIG. 9.
Figure 14:
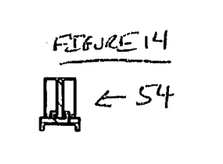
FIG. 14 is an end view of the portion of the hold-down assembly depicted in FIG. 13.
Figure 15:
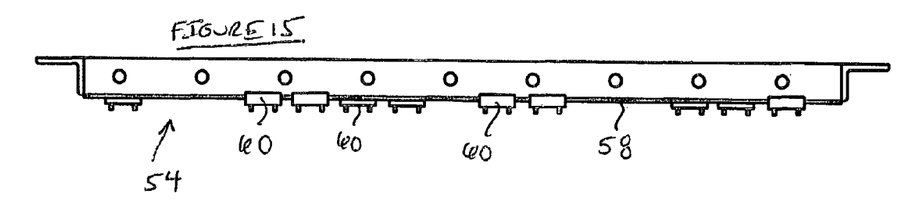
FIG. 15 is a side view of the portion of the hold-down assembly depicted in FIG. 13.
Figure 16:
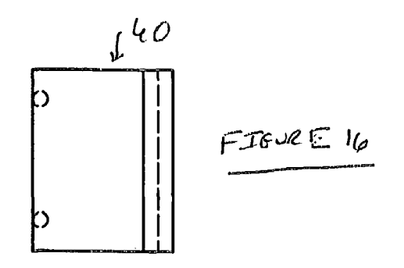
FIG. 16 is an enlarged plan view of a hook of the portion of the hold-down assembly illustrated in FIG. 9.
Figure 17:
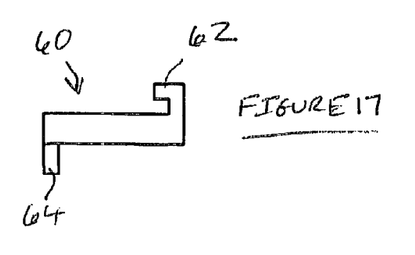
FIG. 17 is an enlarged end view of the hook illustrated in FIG. 16.
Figure 18:
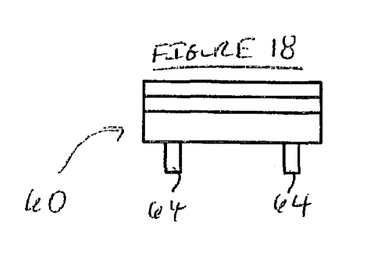
FIG. 18 is an enlarged side view of the hook illustrated in FIG. 16.

FIGS. 9 through 18 depict another preferred embodiment of the present invention. The underdrain blocks 22 are of the same structure as described in FIGS. 5 to 7. Hold-down assembly G prevents underdrain blocks 22 from lifting upwardly and separating from the filter floor H. No portion of hold-down assembly G of this preferred embodiment of the present invention is in direct contact with the uppermost surface of the underdrain blocks 22. Hold-down assembly G also includes an anchor assembly having a plurality of anchors 52 embedded in filter floor H between the laterals. Preferably, anchors 52 are all-threads threaded over the entire portion of the anchor. However, any suitable anchor may be used. As seen in FIGS. 10 and 11, the anchor assembly further includes a cross member 54 connected to and extending between anchors 52 disposed on opposite sides of flume I. As seen in FIG. 13, each end of cross-member 54 includes openings 56 for receiving the corresponding anchor 52. The cross member 54 includes an outwardly extending rail or support member 58 having a plurality of hold-down members or sections 60 slidably mounted thereon. Specifically, hold-down members or sections 60 preferably are clips having an inwardly extending flange 62 that receives rail 58 and allows hold-down members or sections 60 to slide along rail 58. Hence, the position of hold-down members or sections 60 along the longitudinal axis of underdrain blocks 22 can be readily varied so that a given clip can be aligned with a given lug, rib or other corresponding portion of the block. Further, flange 62 allows for some relative vertical and lateral movement between hold-down members or sections 60 and rail 58 to compensate for variances in the space between underdrain laterals. Preferably, rail 58 extends perpendicular to anchor 52 as seen in FIGS. 10 to 12.

Preferably, each hold-down clip 60 includes two pins 64 that are received in a cavity of a corresponding lug of underdrain blocks 22. However, it will be readily appreciated that the number of pins on a clip may be varied as desired. Further, the precise manner of interconnecting hold-down clips 60 with and the corresponding lugs or other portion of underdrain blocks 22 may be varied as desired. For example, an opening passing entirely through the lug could receive one or more pins of hold-down clips 60. Further, instead of an interlocking connection, hold-down clips 60 could merely abut the corresponding lugs rather than extend into openings such as cavities formed in the lugs. Further, cross member 54 may be designed to act in concert with the grout to resist uplift forces or designed to resist applicable uplift forces alone, without the benefit of grout.

FIG. 19

Figure 19:
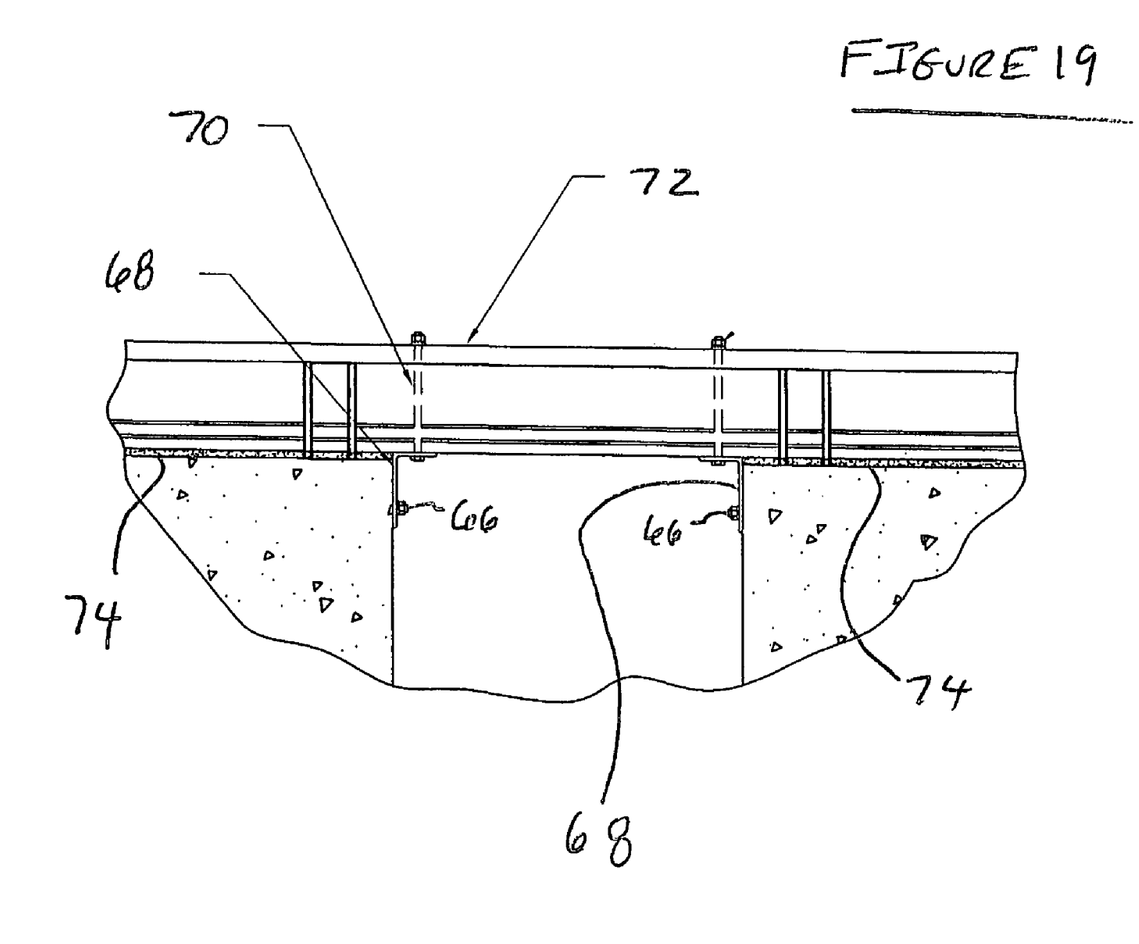
FIG. 19 is a fragmentary sectional view of yet another preferred embodiment of the present invention.

Another preferred embodiment will now be described with reference to FIG. 19. The prior filter systems included an anchor member embedded in the filter floor such that the anchor would experience primarily tension forces to prevent uplifting of the underdrain blocks in the underdrain systems. In this embodiment, all-threads 66 are embedded in filter floor J in a generally horizontal orientation so that the all-threads 66 and filter floor J are placed in shear. One of many possible configurations for connecting All-threads 66 to underdrain block 72 employs angles 68, all-threads 70, nuts and washers. Specifically, angles 68 connect all-threads 66 to a corresponding all-thread 70 passing through underdrain block 72. Nuts and washers may be used to secure all-threads 66 to corresponding angles 68. Similarly, nuts and washers may be used to secure all-threads 70 to underdrain block 72. A gasket 74 may be used as opposed to grout to seal flume K.

Figure 20:
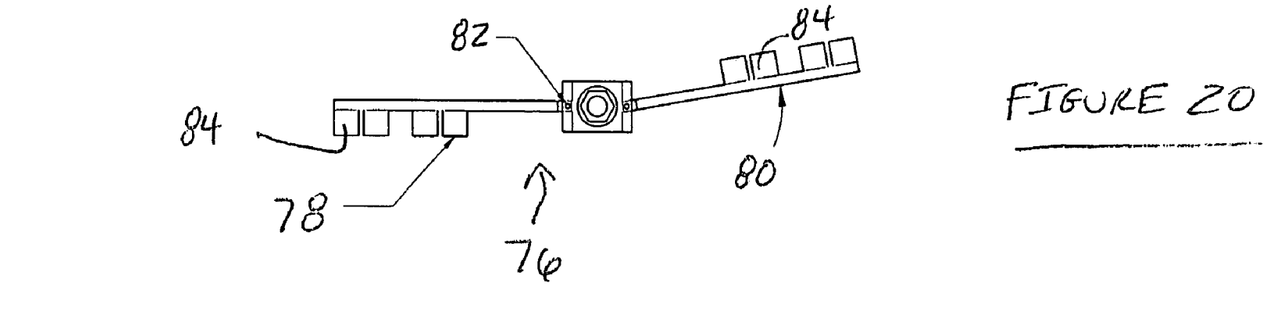
FIG. 20 is a plan view of a portion of a hold-down assembly of yet a further preferred embodiment of the present invention.
Figure 21:
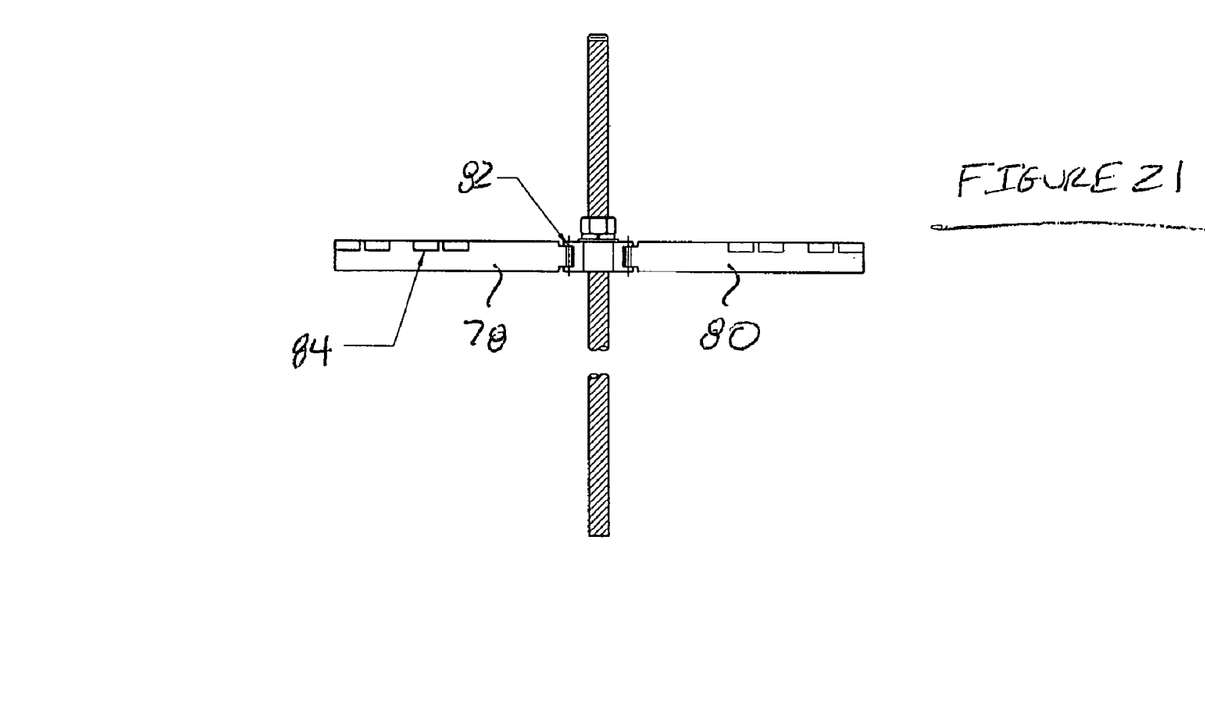
FIG. 21 is a side view of the portion of the hold-down assembly depicted in FIG. 20.

FIGS. 20 and 21

Referring to FIGS. 21 and 22, an alternative hold-down clip 76 is disclosed. Hold-down clip 76 includes a first hold-down section 78 and a second hold-down section 80 pivotally connected to body 82. This configuration allows hold-down sections 78 and 80 to move relative to each other to compensate for variances in the space between laterals. Each of hold-down sections 78 and 80 may include one or more lips 84.

Lips 84 may be provided with pins similar to pins 30 that extend into an opening in a corresponding portion of an underdrain block. While hold-down sections 78 and 80 move relative to each other in a horizontal plane, it will be readily appreciated that the orientation of these sections may be varied to permit movement in a vertical plane as well.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. An apparatus for use in a filter system for filtering water or wastewater, said apparatus comprising:
   (a) an underdrain block for supporting at least a portion of a filter bed of a filter system, said underdrain block having a plurality of exterior walls forming a substantially hollow interior for receiving fluids during operation of the filter system, said underdrain block having a longitudinal axis;
   (b) a hold-down assembly including an anchor assembly adapted to be embedded in a floor of a filter system and a hold-down member for engaging at least a portion of said underdrain block, said hold-down member being secured to said anchor assembly and adjustable relative to said anchor assembly to vary a position of said hold-down member along said longitudinal axis of said underdrain block, said anchor assembly includes a support member, said hold down member is a clip slidably mounted on said support member so that a position of said clip relative to said underdrain block may be varied.

2. An apparatus as set forth in claim 1, wherein:
   (a) said hold-down member includes first and second pins, said first pin is spaced from said second pin.

3. An apparatus as set forth in claim 2, further including:
   (a) a plurality of hold-down members adjustable relative to said anchor assembly.

4. An apparatus as set forth in claim 3, wherein:
   (a) each of said plurality of hold-down members is slidably mounted on a portion of said anchor assembly.

5. An apparatus as set forth in claim 3, further including:
   (a) at least first and second underdrain blocks; and,
   (b) said anchor assembly being disposed between said first and second underdrain blocks.

6. An apparatus as set forth in claim 5, further including:
   (a) a plurality of hold-down members adjustably mounted on said anchor assembly, at least one of said plurality of hold-down members engages said first underdrain block and at least another of said plurality of hold-down members engages said second underdrain block.

7. An apparatus as set forth in claim 1, further including:
   (a) at least first and second underdrain blocks, said anchor assembly being disposed between said first and second underdrain blocks, said support member includes at least a first rail on which a plurality of hold-down members are slidably mounted.

8. An apparatus for use in a filter system for filtering water or wastewater, said apparatus comprising:
   (a) an underdrain block for supporting at least a portion of a filter bed of a filter system, said underdrain block having a plurality of exterior walls forming a substantially hollow interior for receiving fluids during operation of the filter system, said underdrain block having a longitudinal axis;
   (b) a hold-down assembly including an anchor assembly fixed relative to said underdrain block and a hold-down member for engaging at least a portion of said underdrain block, said hold-down member being secured to said anchor assembly and adjustable relative to said anchor assembly and said underdrain block to vary a position of said hold-down member along said longitudinal axis of said underdrain block; and,
   (c) said anchor assembly includes a support member, said hold-down member is a clip that is slidably mounted on said support member so that a position of said clip relative to said underdrain block may be varied.

9. An apparatus as set forth in claim 8, wherein:
   (a) said support member includes a rail.

10. An apparatus as set forth in claim 9, wherein:
    (a) said anchor assembly includes a vertically extending anchor, said rail includes an opening for receiving said vertically extending anchor.

11. An apparatus as set forth in claim 10, wherein:
    (a) said rail has first and second ends, said opening being formed in one of said first and second ends.

12. An apparatus as set forth in claim 11, wherein:
    (a) said rail extends perpendicular to said vertically extending anchor.

13. An apparatus as set forth in claim 11, wherein:
    (a) an opening is formed in each of said first and second ends of said rail.

\* \* \* \* \*